US011452932B2

(12) United States Patent
Carlisle

(10) Patent No.: US 11,452,932 B2
(45) Date of Patent: Sep. 27, 2022

(54) METHOD OF TEACHING THE SCRIPTURES EMBODIED IN A BOARD GAME

(71) Applicant: David Jerome Carlisle, Gadsden, AL (US)

(72) Inventor: David Jerome Carlisle, Gadsden, AL (US)

(*) Notice: Subject to any disclaimer, the term of this patent is extended or adjusted under 35 U.S.C. 154(b) by 412 days.

(21) Appl. No.: 16/669,067

(22) Filed: Oct. 30, 2019

(65) Prior Publication Data

US 2020/0129846 A1 Apr. 30, 2020

Related U.S. Application Data

(60) Provisional application No. 62/752,568, filed on Oct. 30, 2018.

(51) Int. Cl.
*A63F 3/00* (2006.01)
*A63F 9/18* (2006.01)
*A63F 3/04* (2006.01)
*G09B 19/00* (2006.01)

(52) U.S. Cl.
CPC .......... *A63F 3/001* (2013.01); *A63F 3/00006* (2013.01); *A63F 3/00072* (2013.01); *A63F 3/04* (2013.01); *A63F 9/18* (2013.01); *G09B 19/00* (2013.01); *A63F 2003/0011* (2013.01)

(58) Field of Classification Search
None
See application file for complete search history.

(56) References Cited

U.S. PATENT DOCUMENTS

| 4,907,808 | A | * | 3/1990 | Turner | A63F 3/00006 273/276 |
| 5,152,535 | A | * | 10/1992 | Roberts | A63F 3/001 273/249 |
| 7,458,581 | B1 | * | 12/2008 | Balosky | A63F 3/00697 273/254 |
| 2008/0007000 | A1 | * | 1/2008 | Rodela | A63F 3/00176 273/249 |

* cited by examiner

*Primary Examiner* — Sunit Pandya
(74) *Attorney, Agent, or Firm* — Dunlap Bennett & Ludwig, PLLC

(57) ABSTRACT

A method of teaching a path to salvation according to the New Testament of the King James Version of the Bible is provided. The method is embodied in a board game having a plurality game squares, each game square having a citation from Christian Scriptures. Each of the game squares is organized in one of five sacramental sections associated with the citation. Each sacramental section has a plurality of staggered columns, and each column is formed by the game squares. Players help each other navigate their game pieces through the columned game squares, by answering Scripture-related questions, to reach an uppermost or top portion of the columns of each sacramental section.

4 Claims, 5 Drawing Sheets

FIG. 3 — BAPTISM (14)

Row B: Acts 2:38 | Jn 9:31 | Matt 7:21 | Matt 28:18-20
Row A: 1 Pe 3:21 | Mr 16:15-16 | Eph 4:4-7 | 1 Cor 12:13 | Acts 5:14
Row P: 1 Cor 1:10 | Matt 6:10 | 1 Cor 12:20 | Rom 3:23 | 1 Cor 12:27 | Acts 5:42
Row T: 2 Pe 1:20-21 | Matt 15:9 | Col 2:20 | Col 1:18 | 1 Col 1:24 | 1 Cor 12:27 | Dis Acts 2:46
Row I: Rom 6:1-7 | Rev 19:6-9 | Eph 2:16-18 | Rm 1:26-32 | Acts 18:8 | Dis Lk 9:23
Row S: Matt 11:28-31 | Rev 1:5 | 1 Pe 3:12 | Isa 59:1-2 | Dis Acts 5:42 (22)
Row M: Acts 5:29-33 | Acts 5:14 | Acts 22:16 | Heb 5:9

FIG. 2 — HEAR (12)

Row H: 1-Cor 10:1-11 | Jer 31:31-34 | Rom 3:23 | Col 2:14 | Dis Matt 5:17-18
Row E: Rom 10:17 | Matt 22:36-40 | 1-Cor 15:1-4 | Matt 16:4-23 | Dis Rm 1:16
Row A: Rom 10:17 | Matt 22:36-40 | Jn 10:16-18 | Matt 1:18-22 | Dis Rm 16:13-18
Row R: 1 Tim 1:15 | Heb 11:1-6 | Lk 9:18-22 | Matt 3:13-17 | Dis Heb 1 1:6 (22)

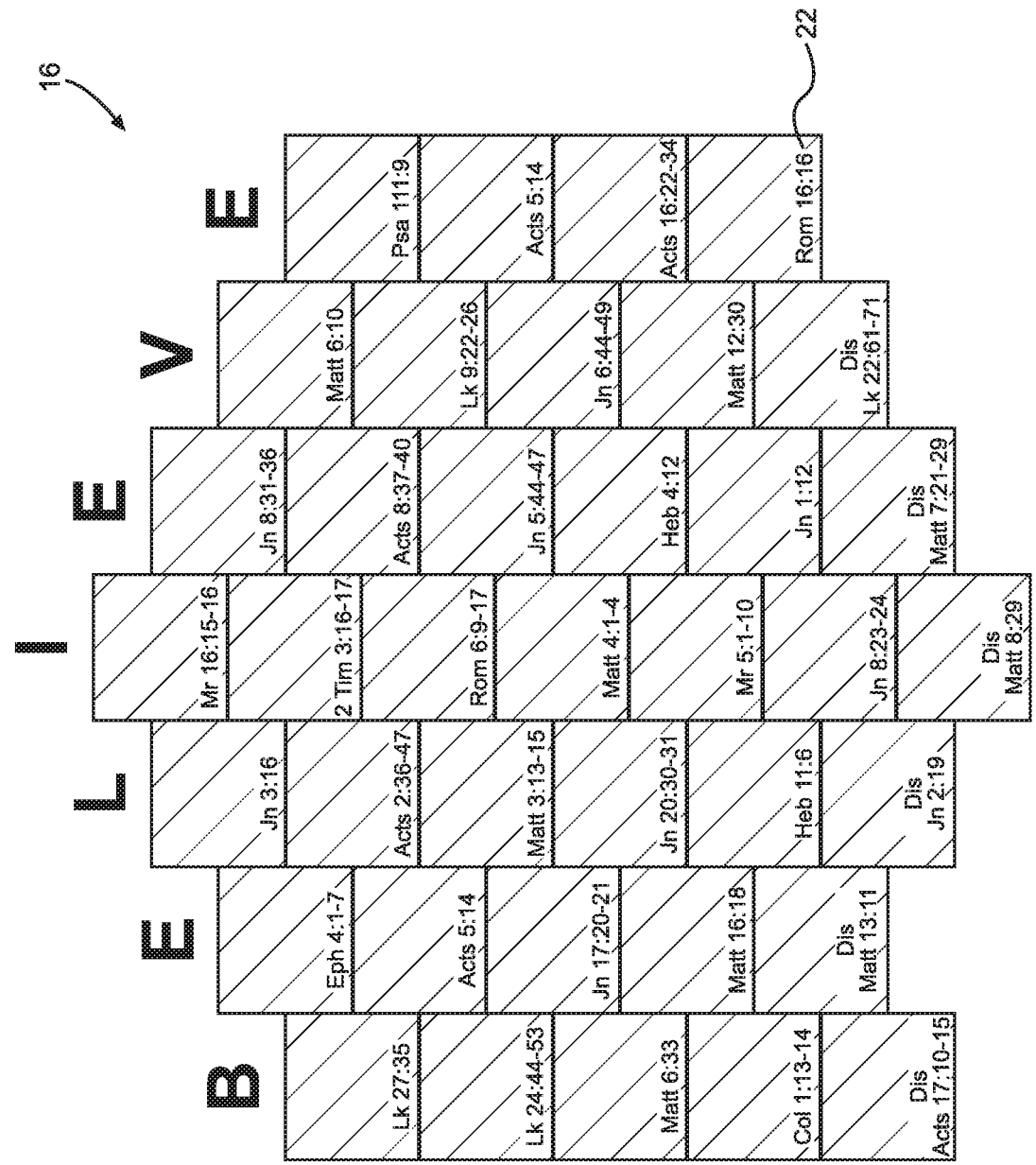

METHOD OF TEACHING THE SCRIPTURES EMBODIED IN A BOARD GAME

CROSS-REFERENCE TO RELATED APPLICATION

This application claims the benefit of priority of U.S. provisional application No. 62/752,568, filed 30 Oct. 2018, the contents of which are herein incorporated by reference.

BACKGROUND OF THE INVENTION

The present invention relates to religious teaching aids and, more particularly, to a Christian-study teaching aid embodied in a board game that emphasizes the Christian Scriptures, their organization and relationship with core sacramental themes in achieving salvation.

Current game-base teaching aids for learning about Christianity consists of bible trivia; however, randomly shuffled factoids do not tell a person how to be saved according to the New Testament of the Bible.

As can be seen, there is a need for a Christian-study teaching aid embodied in a board game that emphasizes the Christian Scriptures, their organization and their interrelationship with key sacramental themes. The present invention not only creates a family-oriented, fun, non-competitive atmosphere to help learn about the Bible, the present invention also explicitly shows players a route to get to heaven, a clear path to salvation.

In other words, the board game embodied in the present invention teaches the sinner how to be saved and get to heaven according to the New Testament of the King James Version of the Bible.

SUMMARY OF THE INVENTION

In one aspect of the present invention, a method of teaching the Christian scriptures includes the following: providing a game board having a playing surface providing a plurality of board portions, wherein each board portion a Christian scriptures citation; the plurality of board portions divided into five sacramental sections; each sacramental section comprising a plurality of staggered columns; and each column comprising a subset of the plurality of board portions; and providing a question related to each Christian scripture citation for each board portion each player occupies, wherein each player advances to a subsequent board portion by answering said question, wherein the plurality of sacramental sections includes a baptism section, a believe section, a confess section, hear section and a repent section, wherein only one or two of the columns in each sacramental section defines a top board portion for said sacramental section; further including an English letter is adjacent and upward of each column, wherein the English letters of each sacramental section, when read left to right, spells a theme associated with said sacramental section, wherein each player wins upon advancing to each of the said top board portions.

These and other features, aspects and advantages of the present invention will become better understood with reference to the following drawings, description and claims.

BRIEF DESCRIPTION OF THE DRAWINGS

FIG. 2 is an enlarged top view of an exemplary embodiment of a hear section 12 of the bible scripture board game 10 of the present invention;

FIG. 3 is an enlarged top view of an exemplary embodiment of a baptism section 14 of the bible scripture board game 10 of the present invention;

FIG. 4 is an enlarged top view of an exemplary embodiment of a believe section 16 of the bible scripture board game 10 of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a method of teaching a path to salvation according to the New Testament of the King James Version of the Bible. The method is embodied in a board game comprising a plurality game squares each with a citation from Christian Scriptures. Each of the game squares is organized in one of five sacramental sections associated with the citation. Each sacramental section comprises a plurality of staggered columns, each column comprises the game squares. Players help each other navigate their game pieces through the columns to reach an uppermost or top portion of the columns of each sacramental section.

Figure 1:
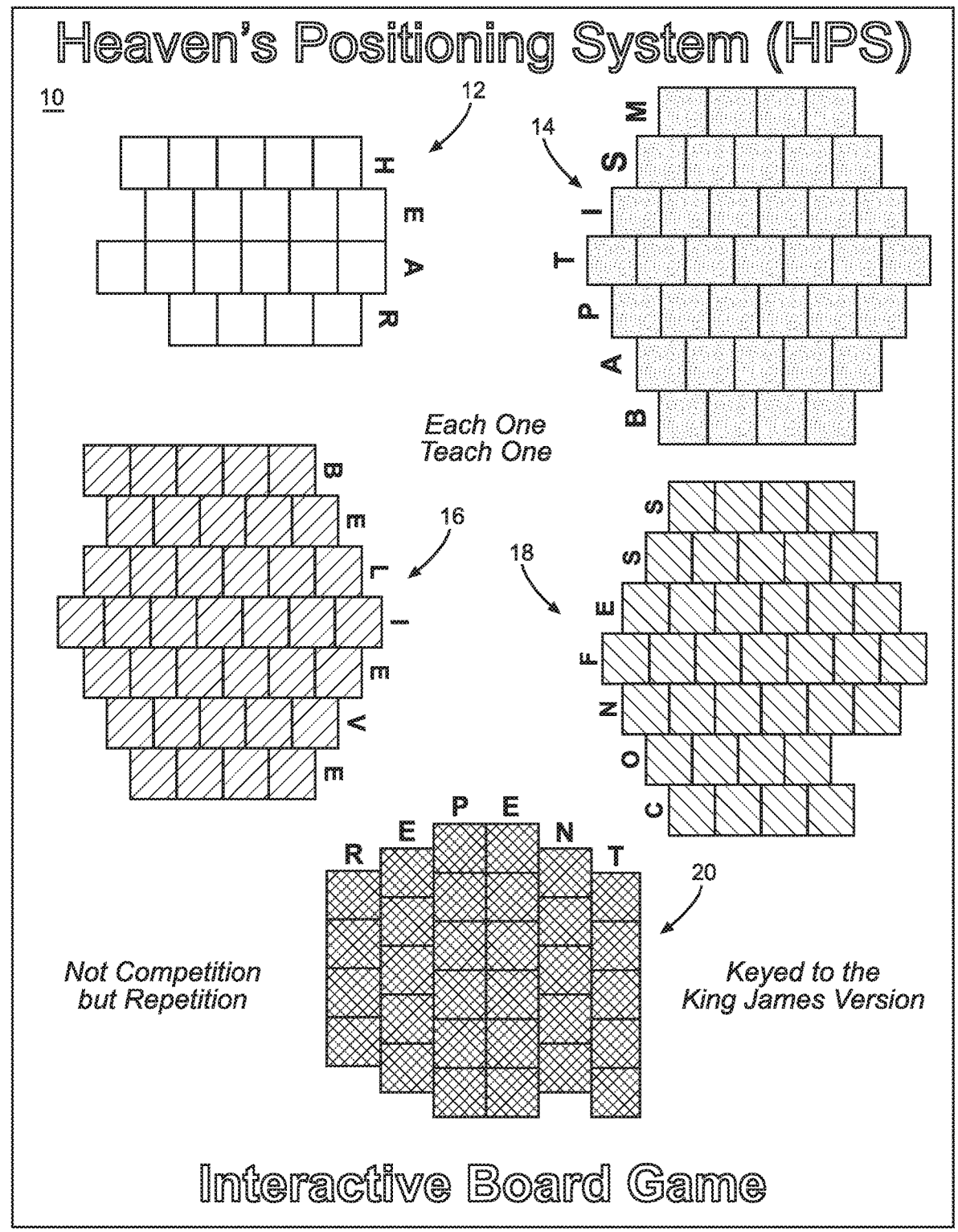
FIG. 1 is a top plan view of an exemplary embodiment of a bible scripture board game 10 of the present invention.
Figure 5:
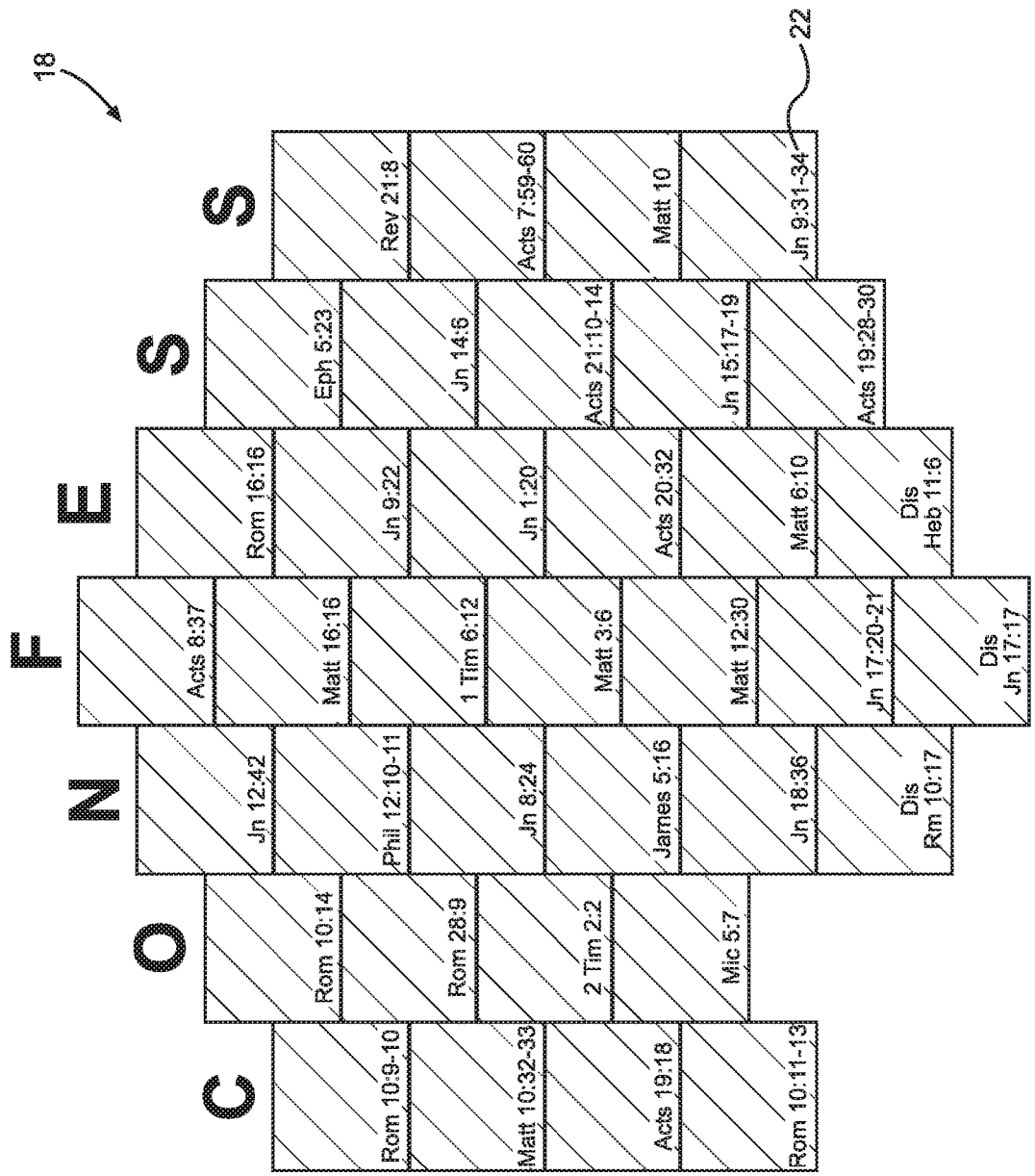
FIG. 5 is an enlarged top view of an exemplary embodiment of a confess section 18 of the bible scripture board game 10 of the present invention.
Figure 6:
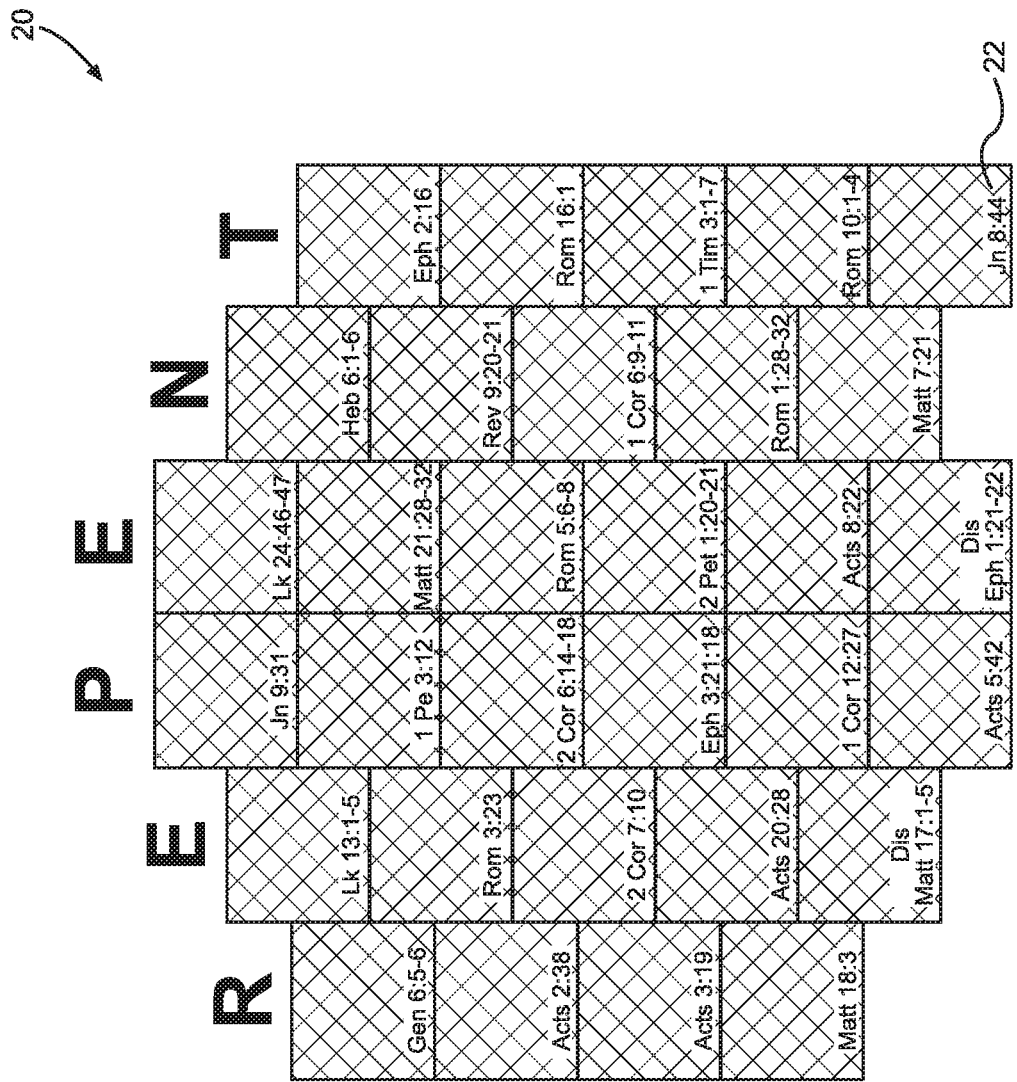
FIG. 6 is an enlarged top view of an exemplary embodiment of a repent section 20 of the bible scripture board game 10 of the present invention.

Referring to FIGS. 1 through 6, the present invention may include a method of teaching a path to salvation according to the New Testament of the King James Version of the Bible. The method is embodied in a board game (colloquially known as the "Strait and Narrow") comprising a plurality of Christian scriptures citations 22, labeled by chapter and verse, organized by and around one of five Christian rites or sacraments, which are recognized as of particular importance and significance in traversing the path to salvation. Specifically, the chapters and verses of the Christian scriptures are derived from the New Testament of the King James Version of the Bible, and the sacraments include baptism, belief, confession, and repentance.

The game board 10 includes a plurality of sacramental sections comprising a hear section 12; a baptism section 14; a believe section 16; a confess section 18; and a repent section 20. It should be understood that in playing or using the game the order of play could be either clockwise or counterclockwise or skip sections with regarding to the plurality of sacramental sections. For instance, play could begin with the hear section 12; followed by the believe section 16; then the repent section 20; then the confess section 18; and, finally, the baptism section 14.

Each sacramental section comprises a plurality of game squares, each game square (or board portion) having a citation 22 of a chapter and verse of one of the Christian Scriptures. The game squares are arranged in a plurality of staggered columns so that only one or two columns protrude above the remaining columns of the associated sacramental section, as illustrated in FIG. 2-6.

It should be understood by those skilled in the art that the use of directional terms such as upper, upward, top, lower, downward, bottom and the like are used in relation to the illustrative embodiments as they are depicted in the figures, the upward direction being away from the figure numbers of FIG. 2 through FIG. 6, and a downward direction being toward the figure numbers of FIG. 2 through FIG. 6. 'Top' being the most upward or furthest away from said figure numbers of FIG. 2 through FIG. 6.

Just upward of each column of each sacramental column is a letter corresponding with the title of the sacramental section associated with each column, wherein the letters of each sacramental section read, left to right, spell out the title of said sacramental section.

One or more players can navigate the game board 10 through moving game pieces (not shown) based on a rolled tally of one or more game die (not shown) and successfully answering Scripture-related questions of game cards (not shown). Each Scripture-related question may be associated with the general sacramental section and/or the cited chapter and verse of Scripture. Each sacramental section or stage has a top portion toward, which each player strives through answering the questions of the game cards. Players work together because each step helps the player and other players reach the main goal of traversing to the top portion of each sacramental section or stage. The game continues until each player reaches the top of each sacramental section or after all players have completed all of the plurality of sacramental sections, however the player may choose to proceed, depending on one of several embodiments. Players work together through answering the questions in fellowship, helping themselves and each other enhance their Biblical literacy, knowledge of the scripture and how they sacramentally harmonize to divine a true path to salvation.

The present invention works better with players willing to learn, or in other words, sinners who want to be saved.

It should be understood, of course, that the foregoing relates to exemplary embodiments of the invention and that modifications may be made without departing from the spirit and scope of the invention as set forth in the following claims.

What is claimed is:

1. A method of teaching the Christian scriptures, comprising:
   providing a game board having a playing surface providing a plurality of board portions, wherein each board portion a Christian scriptures citation;
   the plurality of board portions divided into five sacramental sections;
   each sacramental section comprising a plurality of staggered columns; and
   each column comprising a subset of the plurality of board portions; and
   providing a question related to each Christian scripture citation for each board portion each player occupies, wherein each player advances to a subsequent board portion by answering said question, wherein the plurality of sacramental sections includes a baptism section, a believe section, a confess section, hear section and a repent section.

2. The method of claim 1, wherein only one or two of the columns in each sacramental section defines a top board portion for said sacramental section.

3. The method of claim 2, further comprising an English letter is adjacent and upward of each column, wherein the English letters of each sacramental section, when read left to right, spells a theme associated with said sacramental section.

4. The method of claim 3, wherein each player wins upon advancing to each of the said top board portions.

* * * * *